May 10, 1949.   W. G. CORSON   2,469,633
APPARATUS FOR FORMING RETREADING STRIPS FOR TIRES
Filed Feb. 26, 1945   4 Sheets-Sheet 1
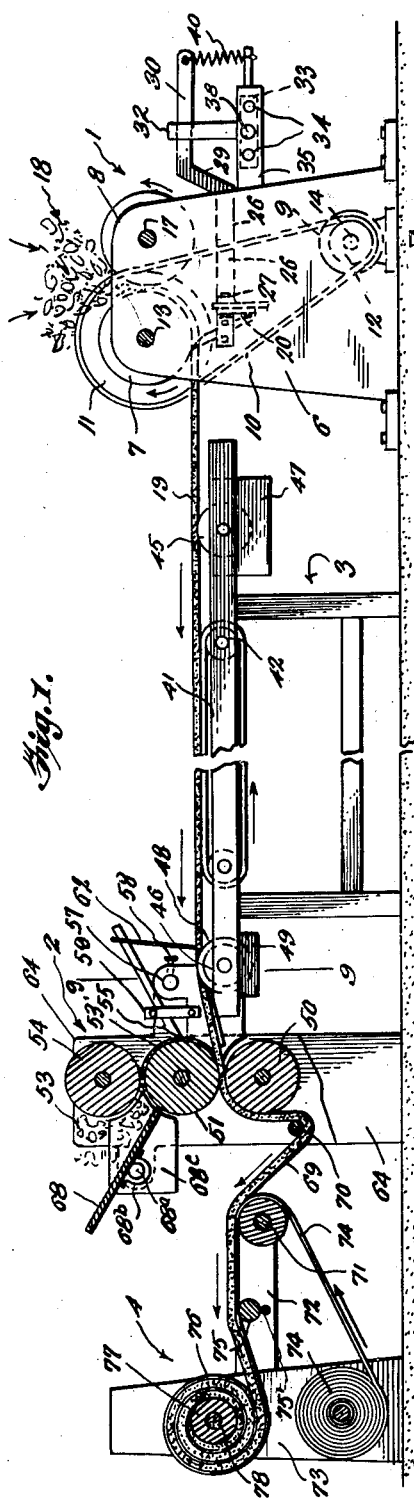
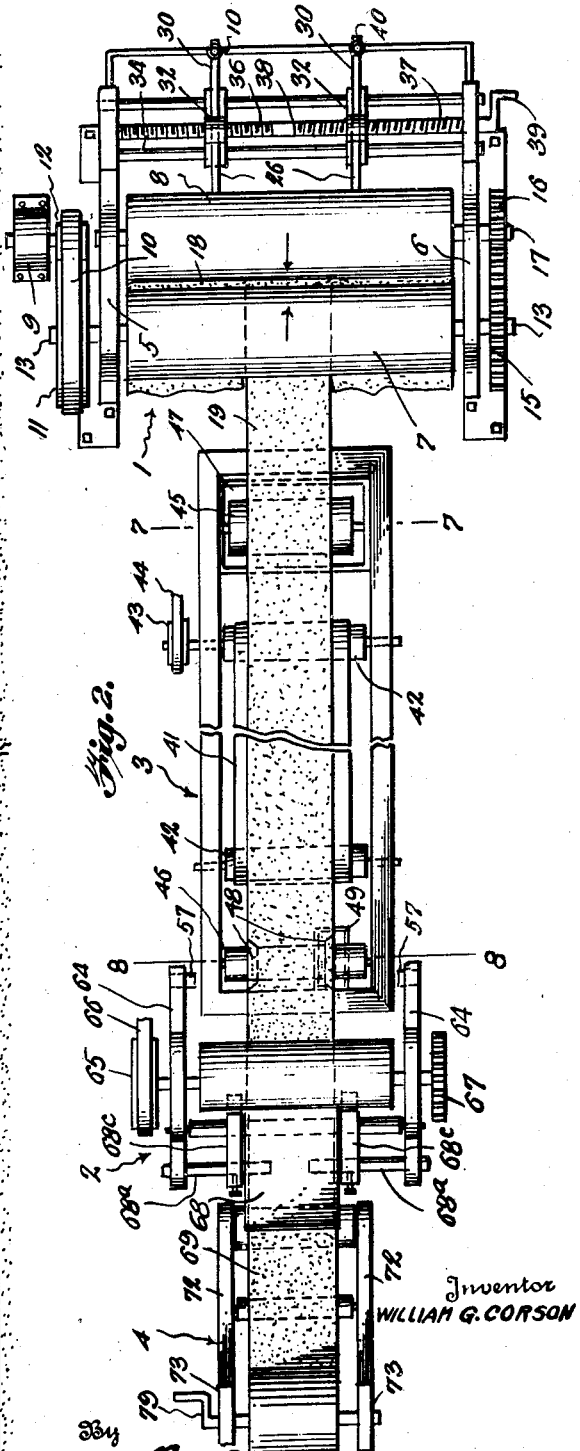
Inventor
WILLIAM G. CORSON May 10, 1949.  W. G. CORSON  2,469,633
APPARATUS FOR FORMING RETREADING STRIPS FOR TIRES
Filed Feb. 26, 1945  4 Sheets-Sheet 2
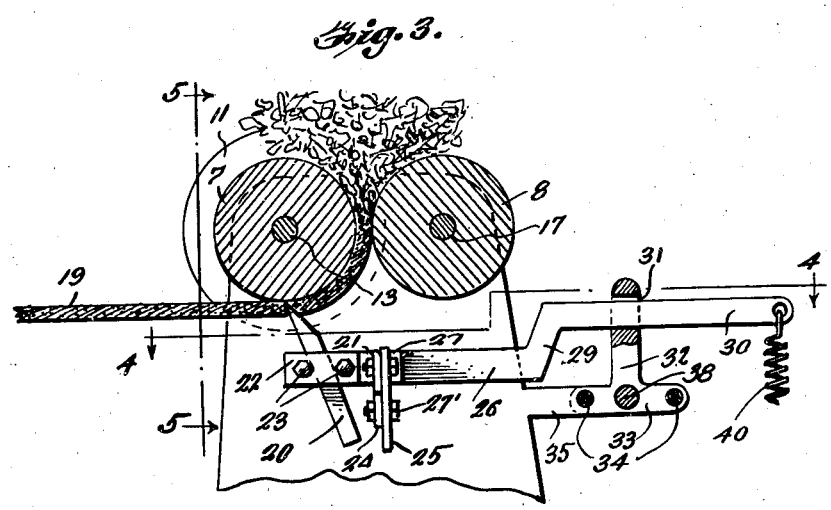
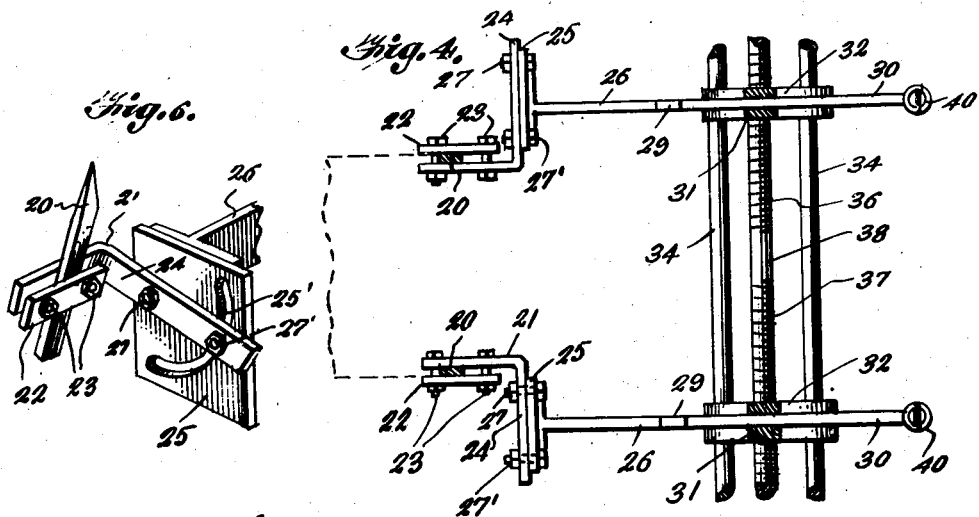
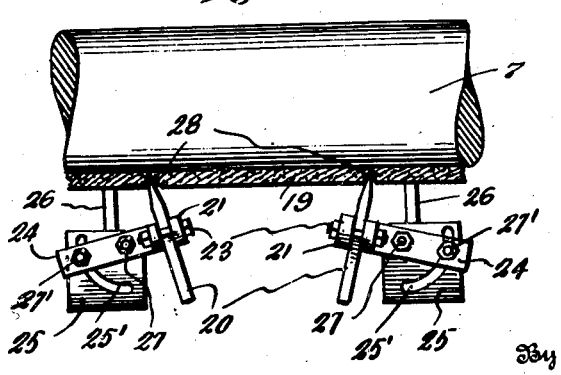
Inventor
WILLIAM G. CORSON
Attorney May 10, 1949.  W. G. CORSON  2,469,633
APPARATUS FOR FORMING RETREADING STRIPS FOR TIRES
Filed Feb. 26, 1945  4 Sheets-Sheet 3
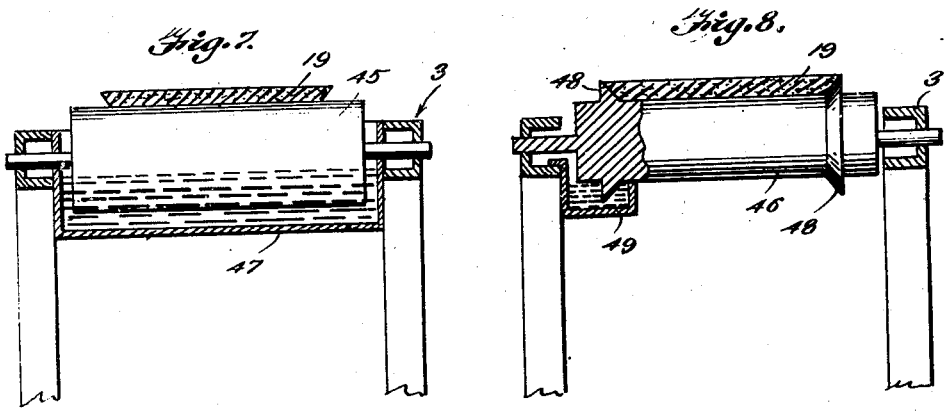
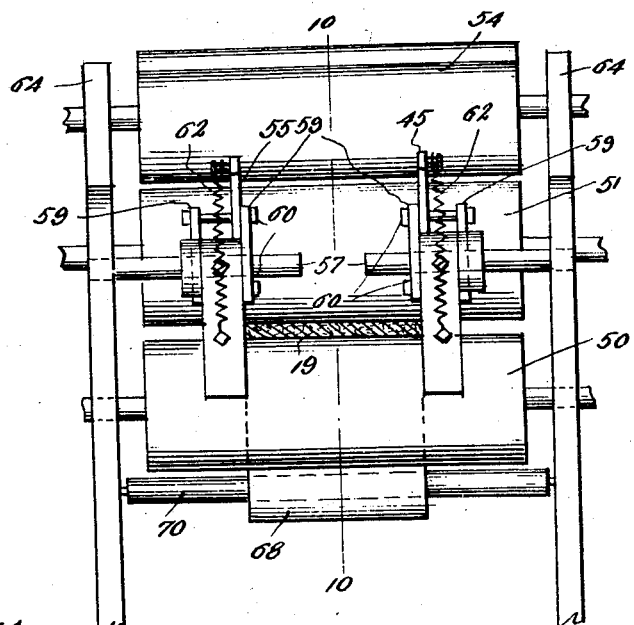
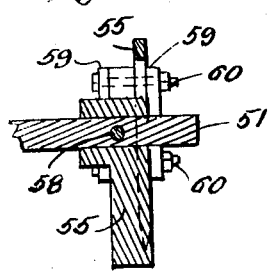
Inventor
WILLIAM G. CORSON May 10, 1949. W. G. CORSON 2,469,633
APPARATUS FOR FORMING RETREADING STRIPS FOR TIRES
Filed Feb. 26, 1945 4 Sheets-Sheet 4
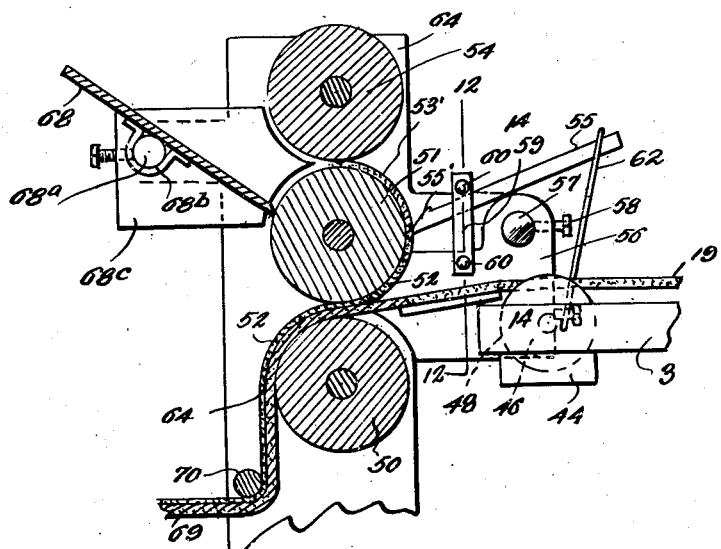
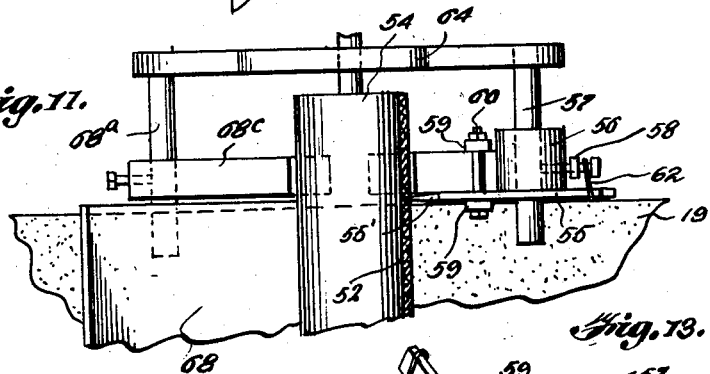
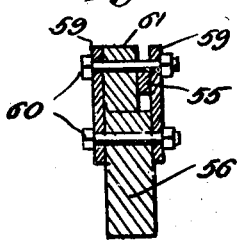
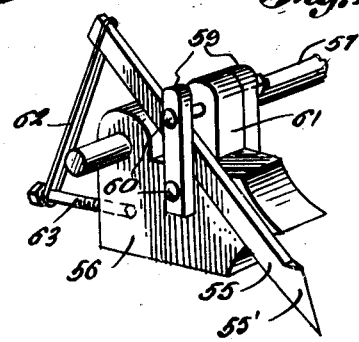
Inventor
WILLIAM G. CORSON
By
Attorney Patented May 10, 1949

2,469,633

UNITED STATES PATENT OFFICE 2,469,633

APPARATUS FOR FORMING RETREADING STRIPS FOR TIRES

William G. Corson, Barberton, Ohio

Application February 26, 1945, Serial No. 579,827

2 Claims. (Cl. 154—9)

This invention relates to an apparatus for forming retreading strips for tires, such strips being known as "camelback" or tire capping material, and it is one object of the invention to provide an apparatus by means of which rubber stock may be rolled in a mill until soft and heated, the rolled stock being cut to form a thick tread strip which is fed from the mill while still warm to a calendar machine where a thin strip of tacky rubber, known as cushion, is formed and applied while warm to the tread strip, the two strips being brought into contact with each other under pressure and the exposed surface of the tacky strip being then covered with a strip of varnished Holland cloth or the like and, together therewith, formed into a roll of such size that it may be readily handled.

Another object of the invention is to provide the apparatus with a mill for forming the tread strip wherein the rubber stock may be repeatedly passed through the mill and a portion cut from a sheet of rubber to form a tread strip of predetermined width and thickness, the rubber being cut by knives so mounted that they may be shifted longitudinally of rollers between which the rubber passes and the width of the strip formed thereby controlled.

Another object is to so mount the knives that arms carrying the same may be tilted to move the knives into and out of cutting position, pressure being applied to the arms or levers carrying the knives so that the knives will be urged toward a roller and caused to very effectively cut through the portion of the rubber sheet passing about the roller.

Another object is to so mount the knives that as they cut through the rubber sheet the strip formed will have beveled side edges of predetermined angle.

Another object is to provide an apparatus of this character wherein the tread strip is delivered from the mill to a table equipped with a conveyor for facilitating movement of the strip along the table and having at one end means for coating a surface of the strip with a mild lubricant such as soap stone or equivalent material, means being provided at the other end of the table for coating or putting an identifying color line on the tread strip.

Another object is to provide an apparatus wherein the table is disposed between the mill and the calendar machine so that the tread strip may be delivered directly from the mill to the calendar machine where a very thin strip of tacky rubber formed in the calendar machine and known as a cushion is directly applied to the tread strip and the two strips pressed together while warm so that they firmly adhere to each other and will not have a tendency to separate after they have cooled.

Another object is to provide an apparatus wherein the cushion or facing strip of thin tacky rubber is cut the same width as the tread strip by knives which are adjustably mounted in conjunction with guides, there being also a scraper for engaging a roller of the calendar machine at opposite sides thereof from the knives and loosening the united tread and cushion strips from the roller.

A further object is to provide back of the calendar machine a stand or the like carrying a roll of Holland cloth which is applied to the exposed surface of the facing sheet and the finished retreading strip formed into a roll of suitable size, the Holland cloth having size and manufacturer's name stamped thereon at spaced intervals by a roller.

And a still further object of the invention is to provide an apparatus of this character which is simple in construction, capable of being operated by few workmen, and not liable to get out of order.

The invention is illustrated in the accompanying drawings, in which:

Fig. 1 is a side view of the apparatus.

Fig. 2 is a top plan view thereof.

Fig. 3 is a fragmentary sectional view taken vertically through the mill for forming the tread strip.

Fig. 4 is a fragmentary sectional view on the line 4—4 of Fig. 3.

Fig. 5 is a fragmentary sectional view on the line 5—5 of Fig. 3.

Fig. 6 is a perspective view of one of the knives and its mounting.

Fig. 7 is a sectional view on the line 7—7 of Fig. 2.

Fig. 8 is a sectional view on the line 8—8 of Fig. 2.

Fig. 9 is a view in elevation of the calendar machine.

Fig. 10 is a vertical sectional view on the line 10—10 of Fig. 9.

Fig. 11 is a fragmentary top plan view of the calendar machine.

Fig. 12 is a fragmentary sectional view on the line 12—12 of Fig. 10.

Fig. 13 is a perspective view of one knife of the calendar machine and the scraper associated therewith.

Fig. 14 is a sectional view taken transversely through the cutter of Fig. 13.

This improved apparatus consists briefly of a mill 1, a calendar machine 2, a conveyor table 3 extending between mill and calendar machine, and a winder 4 to which the camelback strip is delivered from the calendar machine and formed into a roll together with a strip of varnished cloth or paper which covers the tire-engaging surface of the camelback strip and prevents sticking while it is in its rolled condition.

The mill has a frame including side members 5 and 6 between which rollers 7 and 8 are rotatably mounted. Rotary motion is imparted to the roller 7 from a motor 9 by means of a belt 10 trained about pulleys 11 and 12 carried by the shaft 13 of the roller and the motor shaft 14 and intermeshing gears 15 and 16 are carried by the shaft 13 and the shaft 17 of roller 8 so that rotary motion will be transmitted from roller 7 to roller 8. Since the gear 16 is smaller than gear 15, the roller 8 will turn at a greater speed than roller 7 and the rubber stock 18 fed between the rollers will be subjected to frictional rubbing and heated to soften it as it is formed into a sheet corresponding in thickness to the space between the rollers. During use of the apparatus, the rubber is cut with a knife as it moves about the rollers 7 and is repeatedly fed back between the rollers, thus causing the rubber to be repeatedly subjected to a kneading action by roller 8 and formed in a sheet of rubber which is quite soft and warm.

After the stock has been warmed, a strip of rubber 19 is cut from the soft mass of rubber 18 intermediate the length of roller 7 by knives 20 which are moved toward roller 7 to a cutting position. These knives are secured to brackets 21 by clamping bars 22 which extend along sides of the brackets and are formed with openings through which bolts 23 pass so that the bars may be drawn toward the brackets into gripping engagement with the knives. By so mounting the knifes, they may be adjusted and also readily removed when sharpening is necessary. The brackets 21 have transversely extending portions 24 mounted against plates 25 at ends of lever arms 26 by bolts 27. The extensions 24 of the brackets also carry bolts 27' which pass through arcuate slots 25' formed in the plates 25, and from an inspection of Figs. 5 and 6, it will be seen that by loosening the bolts 27' the brackets may be turned about bolts 27 to angularly adjusted positions and then secured so that the knives will be held in set position and cut through the rubber at a predetermined angle and form the tread strip 19 with sloping side edge faces 28. The arms 26 are formed of strong metal bars which have their front end portions formed with heads to which the plates 25 are welded and their intermediate portions 29 are extended upwardly so that the handle portions 30 of the bars will be upwardly offset and may pass through the eyes 31 at upper ends of fulcrum brackets 32. The brackets have their base portions 33 formed with openings to receive rods 34 carried by arms 35 projecting from the side portions 5 and 6 of the frame and also formed with threaded openings through which engage threaded portions 36 and 37 of a shaft 38 rotatably mounted through the arms 35 and provided at one end with a crank handle 39 by means of which it is turned. The threaded portions of the shaft are oppositely threaded and when the shaft is turned the brackets will be shifted along the rods 34 toward or away from each other, according to direction in which the shaft 38 is turned. Therefore, by turning the shaft 38, the brackets may be moved to a position in desired spaced relation to each other and the tread strip 19 cut from the rubber 18 will be of the desired width. The lever arms 26 have their handles 30 projecting rearwardly from the fulcrum brackets 32 and engaged by springs 40 which exert downward pull and cause the sharp edges of the knives to cut through the rubber as the rollers turn. While springs have been shown for exerting downward pull upon the handles of the lever arms 26, it will be understood that rubber bands, weights or the like may be used. The springs 40 are detachable so that the arms or levers 26 may rock vertically and hold the knives in an inoperative position while the rubber stock is being heated. After the stock is heated the springs or rubber bands are applied to the levers and rock them to the position of Fig. 3, so that the knives will cut the sheet of warm rubber and form the tread strip.

As the strip 19 is cut from the mass of soft rubber 18, a workman draws it forwardly along the table 3 and it will rest upon the conveyor belt 41 trained about rollers 42. One of the rollers 42 has its shaft extended and carrying a pulley 43 about which is trained a belt 44 by means of which the roller is rotated and motion imparted to the conveyor. The tread strip 19 also rests upon rollers 45 and 46 near opposite ends of the table 3. The roller 45 rotates in a container 47 containing a mild lubricant and the roller 46 carries annular ribs 48, one of which operates in a container filled with paint. By providing the rollers 45 and 46, the tread strip will move easily onto and off the conveyor belt 41 and, as it moves toward the conveyor, the roller 45 will apply mild lubricant to the narrow outer surface of the strip. The ribs 48 guide movement of the tread strip and the rib operating in the container 49 serves to apply paint of a predetermined color to one side edge face of the tread strip. Different colors may be selectively applied, according to the type of rubber from which the tread strip is formed and a tire repair man using camelback strips formed in accordance with this invention will be able to accurately identify the type of rubber from which a particular strip is formed.

Upon leaving the table 3, the tread strip moves between the rollers 50 and 51 of the calendar machine 2 and is united with a cushion or facing strip 52 formed of sticky rubber. The stock 53 from which the cushion strip 52 is formed is fed between the roller 51 and an upper roller 54. The stock 53 is warm when fed to the rollers 51 and 54 and will be formed into a very thin sheet 53' as it passes between the rollers. This sheet is cut by knives 55 to form a cushion strip of the same width as the wide face of the tread strip 19. These knives are carried by blocks 56 which are slidable along rods 57 to adjusted positions, where they are held by set screws 58 and, referring to Figs. 12 and 13, it will be seen that each knife is held to its block by clamping bars 59 which are drawn into clamping position by bolts 60. When the bolts are tightened, the knives will each be firmly clamped between a bar 59 and a filler block 61 and since upper ends of the shanks of the knives are engaged by elastic bands or equivalent members 62 anchored at their lower ends to pins 63 projecting from the blocks 56, the knives will be rocked to swing their lower ends upwardly and force the sharpened edges of their blades 55' through the sheet of sticky rubber and make contact with the roller 51. The rods 57 are carried by the side members 64 of the calendar machine between which the rollers are rotatably mounted and, in order to rotate the rollers, the shaft of one has been shown provided with a pulley 65 for engagement by a belt 66, rotary motion being transmitted to the other rollers by intermeshing gears 67. It will be understood that gearing may be used in lieu of the belt and pulley if desired. The portion of the thin sheet of rubber between the spaced knives forms the cushion or facing strip, and if the cushion strip sticks to the roller 51 it is freed from the roller by a scraper 68 which is tiltably mounted across shafts 68a. When such sticking occurs the operator frees the cushion strip from the roller with the scraper and then passes it under roller 70. This is necessary at the beginning of each new feeding of camelback into the calender. The scraper will keep the cushion tread from clinging to the roller and thus prevents it from becoming mixed with the rubber which is being fed into the calender on top of the scraper. Blocks 68c carried by the shafts 68a prevent the scraper plate 68 from sliding along the shafts out of position for engaging the facing strip. Since the tread strip 19 and the cushion strip both pass between the rollers 50 and 51, they will be pressed together while still warm and merge into firm engagement with each other to form the completed camelback strip, indicated by the numeral 69. This camelback strip is led from the rollers 50 and 51 downwardly under a guide roller 70 carried by the side members 64 and then upwardly over a roller 71 rotatably mounted between the arms 72 carried by the side members 73 of the winder 4. A roll of "Holland" 74 formed of varnished linen or paper is rotatably mounted between lower portions of the side members 73 and this strip, which is preferably somewhat wider than the camelback strip, is brought upwardly about the roller 71 so that it bears against the under face of the camelback strip. The camelback strip and the strip of "Holland" 74 extend from roller 71 across roller 75 and are formed into a roll 76 about the roller 77 which has its shaft 78 formed with a crank 79 so that the roller 77 may be turned until a roll of the desired diameter has been formed. The roller 75 is a printing roller for marking the manufacturer's name or trade-mark and size of the camelback strip at intervals spaced from each other longitudinally of the camelback. The printing roller is inked from the inking roller 75'. The camelback strip and strip 74 will then be cut at some point between rollers 71 and 75 and the roll of camelback removed from roller 77 as a finished product ready for sale. Since the strip 74 is wider than the camelback strip, its side edge portions which project from side edges of the camelback strip may be folded against side edge faces of the rolled camelback strip as a shield for the same.

The fact that the tread strip and facing strip are formed and assembled as shown is important since sheets of cold rubber stock may be used for forming the tread strip and the stock softened and heated while being prepared for cutting to form the tread strip which is immediately applied under pressure to the facing strip and the two strips thus united to form the camelback strip. The fact that the strips are pressed against each other while warm causes them to merge and stick very tenaciously to each other and they will not be liable to separate when a length of camelback is cut from a roll and the Holland cloth removed. The fact that the mill and the calendar machine are located at opposite ends of the conveyor table carrying the container filled with mold lubricant is also important as the lubricant will be applied as the tread strip passes from the mill along the conveyor to the calendar machine where the strips are united and then pass to the winder in a continuous operation. While the embodiment illustrated shows a mill and a calendar machine for forming the improved camelback strip, it will be understood that a tube machine may be used instead of a mill if desired, or other forming rolls or calender machines may be used in place of the mill.

What is claimed is:

1. In an apparatus for forming retreading strips for tires a mill having a frame and mechanism therein for forming rubber stock into a sheet of rubber, a shaft mounted in said frame sheet-forming mechanism, mountings carried by said shaft and shiftable along the same to adjusted positions in spaced relation to each other, levers pivoted to said mountings and having inner end portions extending under the rollers and outer portions projecting outwardly from the mountings, plates mounted vertically at inner ends of said levers, brackets extending horizontally across said plates and pivoted thereto and having end portions bent to form arms projecting from the plates away from the levers, said plates being formed with arcuate slots concentric with the pivots for the brackets, bolts passing through the brackets and the slots and releasably holding the brackets in angularly adjusted positions, clamping strips at sides of said arms, knives extending vertically between the arms and strips and sharpened at their upper ends and secured in set positions when the clamping strips are tightened, and springs urging outer ends of the arms downwardly and holding the knives in a cutting position.

2. In an apparatus for forming retreading strips for tires a mill including standards and mechanism between the standards for forming soft rubber into a sheet, a frame extending outwardly from said standards, rods carried by the frame transversely thereof, mountings slidable along said rods, a shaft rotatably carried by the frame and having oppositely threaded portions passing through the mountings for shifting the mountings along the rods to positions in desired spaced relation to each other when the shaft is turned, levers pivoted to said mountings and having inner end portions extending under the sheet-forming mechanism, vertical plates at inner ends of said levers, brackets pivoted to said plates transversely thereof and having end portions bent to form arms extending from the plates and away from the levers, clamping strips at sides of said arms, knives clamped between the arms and strips and projecting upwardly therefrom and sharpened at their upper ends, fasteners for releasably securing the brackets and knives in angularly adjusted positions, and springs urging inner ends of the levers upwardly and holding the knives in a cutting position.

WILLIAM G. CORSON.

REFERENCES CITED

The following references are of record in the file of this patent:

UNITED STATES PATENTS

| Number | Name | Date |
| --- | --- | --- |
| 1,089,467 | Gammeter | Mar. 10, 1914 |
| 1,353,934 | Morris | Sept. 28, 1920 |
| 1,469,875 | Beauregard | Oct. 9, 1923 |
| 1,611,218 | Mell | Dec. 21, 1926 |
| 1,913,330 | Brickman | June 6, 1933 |
| 2,009,643 | Woock | July 30, 1935 |
| 2,345,518 | Wendel | Mar. 28, 1944 |
| 2,354,062 | Ritzert | July 18, 1944 |
| 2,354,120 | Haren | July 18, 1944 |
| 2,358,176 | MacDonald | Sept. 12, 1944 |